April 28, 1936.  H. T. THOMAS ET AL  2,038,812

TRANSMISSION MECHANISM

Filed June 8, 1934  2 Sheets-Sheet 2

INVENTOR.
Horace T. Thomas
Albert B. Hays
BY
Charles J. Randall.
ATTORNEY.

Patented Apr. 28, 1936

2,038,812

UNITED STATES PATENT OFFICE 2,038,812

TRANSMISSION MECHANISM

Horace T. Thomas and Albert B. Hays, Lansing, Mich., assignors to Reo Motor Car Company, a corporation of Michigan Application June 8, 1934, Serial No. 729,642

16 Claims. (Cl. 74—260)

This invention relates generally to forward and reverse variable speed transmission mechanisms for motor vehicles and has particular reference to that type comprising planetary gearing including a planetary gear carrier and a centrifugally operated friction clutch. With such structures the friction clutch is employed to couple one of the rotating members of the transmission gearing to the planetary gear carrier, thereby gradually changing the gear ratio until the entire structure revolves at high speed.

In constructions heretofore used, the centrifugally operated members have been carried by the driven member of the gearing and as the speed of the latter is increased the centrifugal force will react to apply pressure to the clutch to effect the gradual coupling action. When the transmission gearing is in reverse the planetary gear carrier is locked against movement by means in connection with the reverse gearing control.

One difficulty that has been encountered with the above constructions is that when the transmission is in reverse drive, the centrifugally operated members continue to react to apply pressure to the clutch. The planetary gear carrier being locked against movement this application of the clutch causes the driven shaft to be slowed down and brought to a stop.

It is an object of the present invention to provide means for preventing operation of the centrifugal members under certain conditions.

Another object of the invention is to provide means for preventing operation of the centrifugal members when the transmission is in reverse drive.

Another object of the invention is to provide automatic means for accomplishing the above object.

A further object of the invention is to provide automatic means for preventing operation of the centrifugal members when the transmission is in reverse drive by utilizing the natural inertia of such means coupled with a construction permitting use of the lubricant in the transmission casing to further augment the said inertia.

Figure 1:
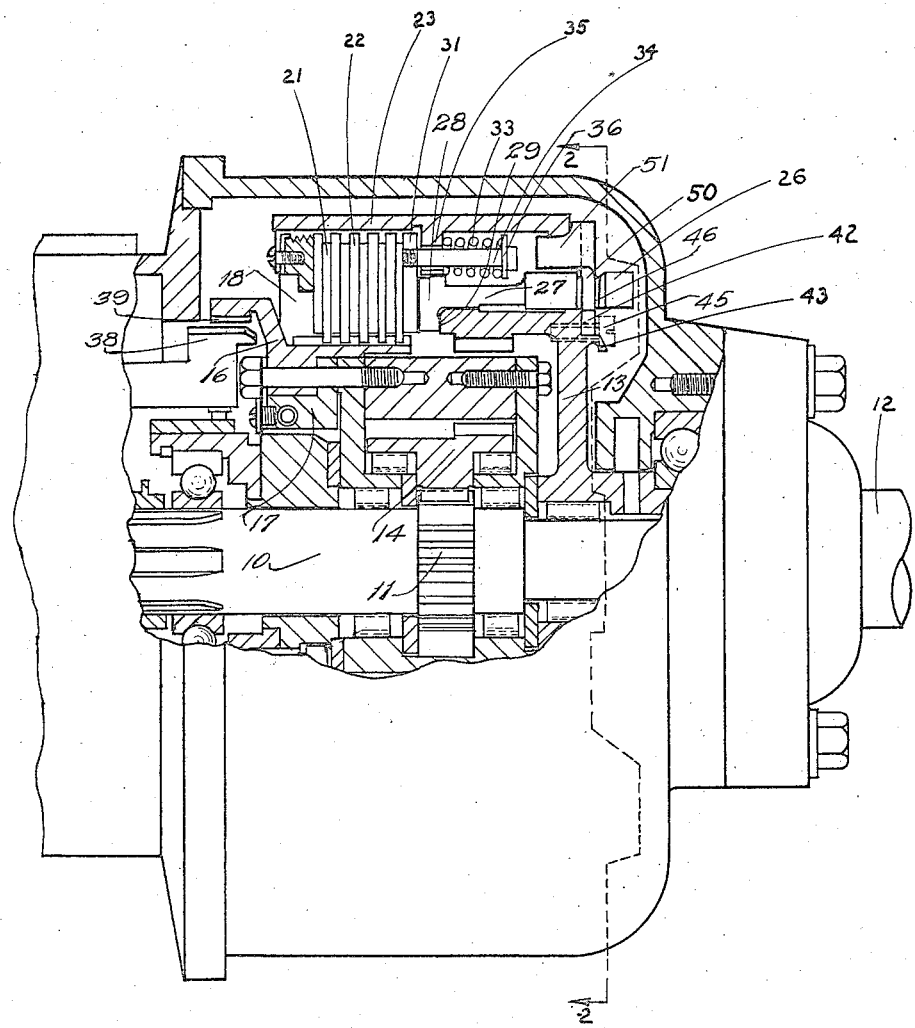
Figure 2:
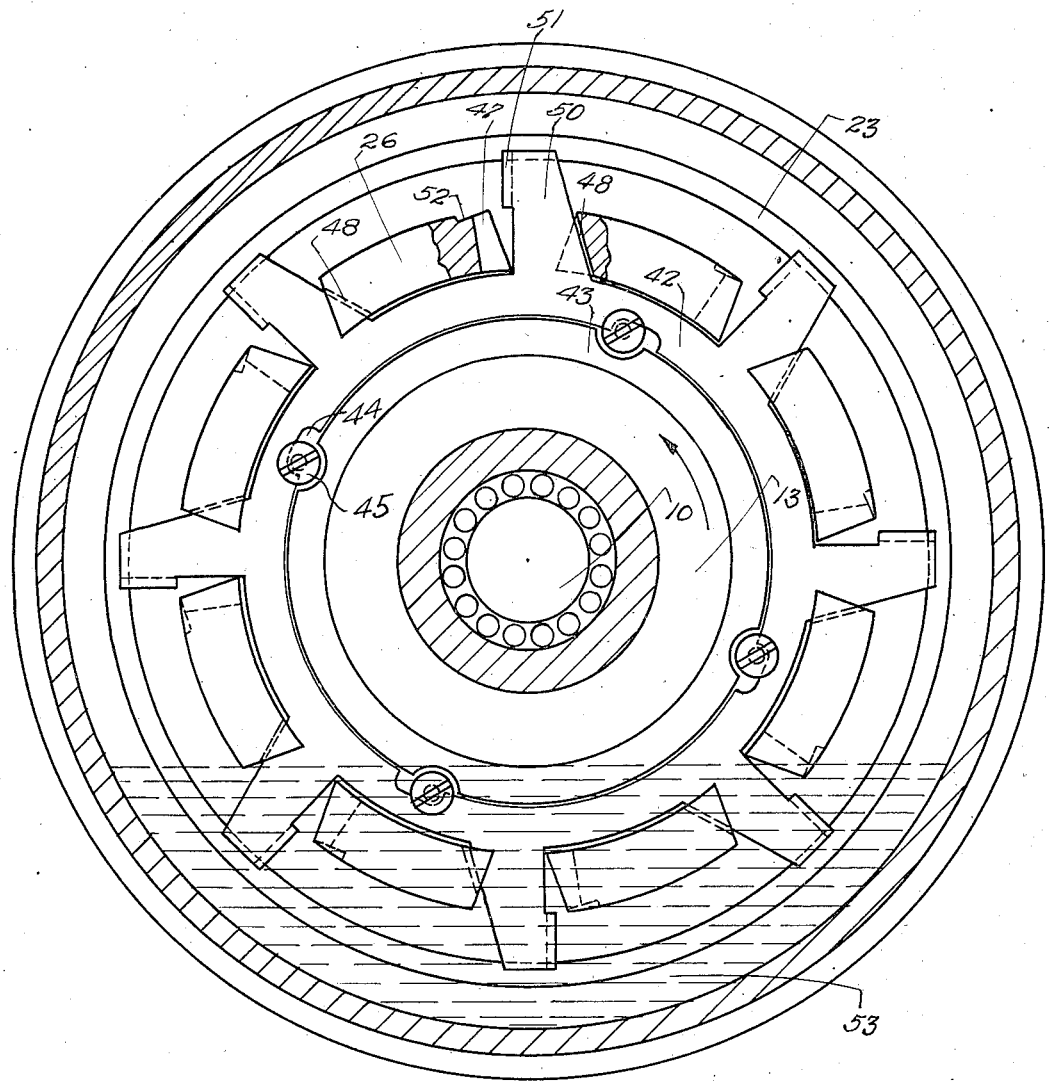

Other objects and advantages of the invention will become apparent from a reading of the following description taken in connection with the accompanying drawings in which;

Fig. 1 is a longitudinal sectional view taken through a portion of a variable speed transmission gearing to which the present invention is applied; and Fig. 2 is an end view, partially in section and partially in elevation, taken substantially on the line 2—2 of Fig. 1.

Referring specifically to the drawings and to Fig. 1 thereof, the variable speed transmission mechanism employed in connection with the present invention comprises a driving shaft 10 having a sun gear 11 thereon, a driven shaft 12 provided with an internal gear wheel 13 surrounding the sun gear, an internal-external ring gear 14 forming an intermediate planetary gear between the sun gear 11 and the internal gear 13 and a gear carrier 16 on which the gear 14 is rotatably mounted. The gear carrier 16 is held from reverse rotation by an overrunning or one-way clutch 17 and therefore normally holds the ring gear 14 against planetary movement while permitting it to revolve around its own axis in transmitting rotation of the sun gear 11 to the internal gear 13. This will drive the shaft 12 at a lower speed than the drive shaft 10 determined by the ratio of the gears 11 and 13 to each other. If, however, the gear carrier 16 is caused to rotate in the same direction as the sun gear 11 it will impart a planetary movement to the gear 14 which will accelerate the movement of the internal gear 13.

To communicate such rotary motion to the carrier 16 a friction clutch 18 is employed, this comprising a series of annular clutch plates 21 keyed to the carrier 16 and an intermediate series of clutch plates 22 keyed to a drum 23 which is coupled to the internal gear wheel 13 to rotate therewith. Pressure for applying friction to these clutch plates is developed by a series of weights 26 carried by the gear 13 which are at the ends of equidistantly spaced levers 27 having T-shaped heads 28. The inner end of the heads 28 has a fulcrum bearing at 29 on the member 13 so that whenever the weights 26 are moved radially outward through centrifugal action, the T-head 28 will be tilted to bring pressure against a follower plate 31 which clamps the friction plates 21 and 22 to each other. Thus the friction will be gradually increased as the angular speed of the member 13 is increased, thereby accelerating the carrier 16 until finally all members rotate at the same speed as the drive shaft 10.

To retract the follower plate 31 when the angular speed of the member 13 decreases, springs 33 are sleeved upon pins 34 which pins are attached to the follower plate 31 and passed through apertures in an abutment flange 35. One end of said spring engages this abutment flange while a collar 36 on the pin 34 forms a bearing for the opposite end of said spring. Thus, as the angular speed of the driven member decreases, the reaction of the springs 33 against the follower plate 31 and T-head 38 of the levers 27 will force the weights 26 radially inward until the clutch is disengaged.

Suitable means (not shown) for reversing the drive shaft 10 and thus the driven member 13, may be provided and controlled from a suitable remote point within the vehicle. When the drive shaft 10 is to be rotated in reverse direction, suitable locking means such as a dog 38 which engages internal teeth 39 on the gear carrier, may be moved simultaneously with the reverse gears to engage the gear carrier 16 preventing its rotation in either direction.

The construction as thus far described has the defect previously referred to that when the transmission is in reverse, the centrifugally operated members 27 continue to react to apply pressure to the follower plate 31. The gear carrier 16 being locked against movement by the dog 38 engaging the teeth 39 of the carrier, the application of the clutch tends to cause a slowing down of the driven shaft. The present invention overcomes this defect by the provision of automatic means to lock the levers 27 against movement when the transmission is in reverse drive.

This automatic locking means comprises a ring member 42 which seats on an annular flanged portion 43 of the driven gear 13 in a manner permitting a limited relative movement of the gear 13 in either direction. This is accomplished by the provision of a plurality of spaced elongated openings or slots 44 on the inner periphery of the ring member which engage pins 45 secured to the gear 13. It will thus be seen that the gear 13 will be permitted to rotate a limited degree in either direction relative to the ring member 42 before the pins 45 strike the ends of the openings 44, at which time both members will rotate together.

As shown in Fig. 2, each of the weights 26 are provided on one side thereof with a slot 47, and on the other side with a slot 48. A plurality of spaced radially extending fingers 50 are provided around the ring member 42 which extend between the weights 26 and which in turn are provided on the side adjacent the slots 47 of the weights 26, with angularly extending projections 51, adapted to lock the weights against movement by engagement with a cut-away portion 52 thereof, under conditions to be later described. These projections 51 also form paddles to contact the oil or other lubricant 53 in the transmission casing for a purpose to be later described.

In operation, when the driven member 13 is moving in the direction of the arrow, or forward drive, the parts will be in the relative positions shown in Fig. 2 and rotating as a unit; that is the fingers 50 will be in engagement with the slots 48 of the weights 26 permitting free radial movement thereof in response to centrifugal force. When, however, the direction of the driven member 13 is reversed, the pins 45 thereon will move to the opposite ends of the slots 44 of the ring member carrying the weights 26 to a position whereby the slots 47 thereof engage the fingers 50, and the cut-away portion 52 is engaged by the angular projections 51, thereby locking the weights against movement.

The rotation of the driven member 13 relative to the locking ring 42 is permitted by the natural inertia of the ring member coupled with the frictional resistance of the oil or other lubricant in the transmission casing which some of the fingers 50 are always in contact with. These two factors provide the necessary resistance to the movement of the ring member 42 so that the member 13 and the weights 26 will move in either direction relative thereto until the pins 45 engage one end of the slots 44.

While only one specific embodiment has been shown and described, it is apparent that the invention is susceptible of numerous modifications in construction and design without departing from the spirit or scope thereof, which is to be limited only by the appended claims.

What is claimed and desired to be secured by Letters Patent is:

1. In a variable speed transmission mechanism, the combination with a plurality of members, one of which is normally rotatable relative to another in either direction, of a friction clutch between said members, centrifugal means carried by the rotatable member for applying pressure to said clutch to increase the friction thereof, and automatically operated means associated with said centrifugal means for locking same against movement when said rotatable member is moving in one direction.

2. In a variable speed transmission mechanism, the combination with a plurality of members, one of which is rotatable relative to another in either direction, of a friction clutch between said members, centrifugal means carried by the rotatable member for applying pressure to said clutch to increase the friction thereof, and automatically operated locking means associated with said centrifugal means and engageable therewith when said rotatable member is moving in one direction and disengageable from said centrifugal means when said rotatable member is moving in the opposite direction.

3. In a variable speed transmission mechanism, the combination with a plurality of members, one of which is rotatable relative to another in either direction, of a friction clutch between said members, centrifugal means carried by the rotatable member for applying pressure to said clutch to increase the friction thereof, and automatic means associated with said centrifugal means for locking same against movement when said rotatable member is moving in one direction.

4. In a variable speed transmission mechanism, the combination with a plurality of members, one of which is rotatable relative to another in either direction, of a friction clutch between said members, centrifugal means carried by the rotatable member for applying pressure to said clutch to increase the friction thereof, and automatic locking means associated with said centrifugal means and adapted to engage same when said rotatable member is moving in one direction and to be disengaged therefrom when said rotatable member is moving in the opposite direction.

5. A variable speed planetary transmission mechanism providing a driving member, a driven member rotatable in either direction and a normally stationary gear carrier, a friction clutch between said driven member and said gear carrier, centrifugal means carried by said driven member for applying pressure to said clutch to increase the friction thereof, and automatic means associated with said centrifugal means to lock same against movement when said driven member moves in one of said directions.

6. A variable speed planetary transmission mechanism providing a driving member, a driven member rotatable in either forward or reverse direction and a normally stationary gear carrier, a friction clutch between said driven member and said gear carrier, centrifugal means carried by said driven member for applying pressure to said clutch to increase the friction thereof, and automatic means associated with said centrifugal means and engageable therewith to lock same against movement when said driven member is rotated in reverse direction.

7. In a transmission gearing, a driving member, a driven member, planetary gearing between said driving member and said driven member including a planetary gear carrier, means for reversing the direction of rotation of said driving member and thereby the direction of rotation of the driven member, means cooperating with said gear carrier to hold the same from rotation in one direction while permitting free rotation in the opposite direction, a friction clutch between said gear carrier and said driven member, centrifugal means carried by said driven member for applying pressure to said clutch to increase the friction thereof, means engageable with said gear carrier to lock it against rotation when said driving member is reversed, and automatic means carried by said driven member engageable with said centrifugal means when said driven member is reversed and disengageable therefrom when said driven member is rotating in forward direction.

8. In a transmission mechanism, a driving member, a driven member, planetary gearing between said driving and said driven members including a normally stationary gear carrier, means for causing rotation of said driven member in forward or reverse direction, a friction clutch between said driven member and said gear carrier, centrifugal means carried by said driven member for applying pressure to said clutch to increase the friction thereof, and automatic locking means associated with said driven member to prevent action of said centrifugal means when said driven member moves in reverse direction.

9. In a forward and reverse variable speed transmission mechanism, a driving member, a driven member, intermediate planetary gearing between said members including a gear carrier, a friction clutch between said gear carrier and said driven member, centrifugal weights on said driven member for applying pressure to said clutch to increase the friction thereof when said transmission is in forward drive, means for locking said gear carrier against rotation when said transmission is in reverse drive, a locking ring concentrically mounted on said driven member to permit a restricted movement of said driven member relative thereto and adapted to engage and lock said centrifugal weights against movement when said driven member rotates in reverse direction and to be disengaged from said weights when said driven member rotates in forward direction.

10. In a variable speed transmission mechanism having relatively rotatable driving and driven members and a friction clutch for connecting said members, a plurality of spaced centrifugal weights arranged about one of said rotatable members to rotate therewith for applying pressure to said clutch to increase the friction thereof, each of said weights being provided with a slot in each side thereof, a ring member concentrically mounted on said last rotatable member to permit a limited relative rotation of said rotatable member and having radial fingers secured thereto provided with angular projections adjacent the ends thereof, said fingers being spaced to extend between said weights and adapted to lie in the slots in one side of said weights when said rotatable member is relatively rotated in one direction with respect to said ring member and to lie in the said other slots when said rotatable member is relatively rotated in the opposite direction, said angular projections being adapted to engage and lock said weights against movement when said rotatable member is in one of said relative positions.

11. In a variable speed transmission mechanism having relatively rotatable driving and driven members and a friction clutch therebetween, centrifugally operable weights carried by one of said members for applying pressure to said clutch to increase the friction thereof, a plate mounted on said last named member to permit a limited relative rotation of said member with respect thereto, locking means associated with said plate to be engaged by said weights to lock them against movement when said rotatable member is in one position relative to said plate and to be disengaged by said weights to release them when said member is in another relative position.

12. In a variable speed transmission mechanism having a driving member, a driven member, an intermediate member, a friction clutch between said driven and said intermediate members and centrifugally operable weights carried by said driven member for applying pressure to said clutch to increase the friction thereof, a ring member carried by said driven member in concentric relation thereto having a plurality of elongated slots formed therein, pins mounted on said driven member to engage said slots whereby a limited degree of rotation of said driven member in either direction relative to said ring member is permitted, and radially extending fingers secured to said ring member having means associated therewith to engage and lock said centrifugal weights against movement when said rotatable member is rotated in one direction relative to said ring member and to release said weights when said rotatable member is rotated in the other direction.

13. In a variable speed transmission mechanism, a casing containing a lubricant, relatively rotatable driving and driven members in said casing to rotate in contact with said lubricant, means for reversing the direction of rotation of one of said members, a friction clutch between said members, centrifugally acting weights mounted to rotate with said last named member for applying pressure to said clutch to increase the friction thereof, a ring member mounted concentrically on said last named member to permit a limited rotative movement of said member relative thereto, and fingers extending radially from said ring member to lock said weights when said rotatable member is in one position relative to said ring member, said fingers also forming paddles which contact said lubricant whereby the resistance of said lubricant to movement thereof and the inertia of said ring member permit a shifting of said rotatable member from one relative position thereto to another depending upon the direction of rotation.

14. In a variable speed transmission mechanism, the combination with a plurality of members, one of which is rotatable relative to another in either direction, of a friction clutch between said members, centrifugal means carried by one of said rotatable members for applying pressure to said clutch to increase the friction thereof, and automatic means associated with said centrifugal means for locking same against movement when said rotatable member is moving in one direction.

15. In a variable speed transmission mechanism, the combination with a plurality of members, one of which is rotatable relative to another, of a friction clutch between said members, centrifugal means carried by one of said rotatable members for applying pressure to said clutch to increase the friction thereof, and automatically operated means carried by said last rotatable member and associated with said centrifugal means for locking same against movement when said rotatable member is moving in one direction.

16. In a variable speed transmission mechanism, the combination with a plurality of members, one of which is rotatable relative to another, of a friction clutch between said members, centrifugal means carried by one of said rotatable members for applying pressure to said clutch to increase the friction thereof, and automatically operated means carried by one of said rotatable members and associated with said centrifugal means for locking same against movement when one of said rotatable members is moving in one direction.

HORACE T. THOMAS.
ALBERT B. HAYS.